June 21, 1960
R. H. WENTORF, JR
2,941,861
METHOD OF MAKING GARNET
Filed March 31, 1955
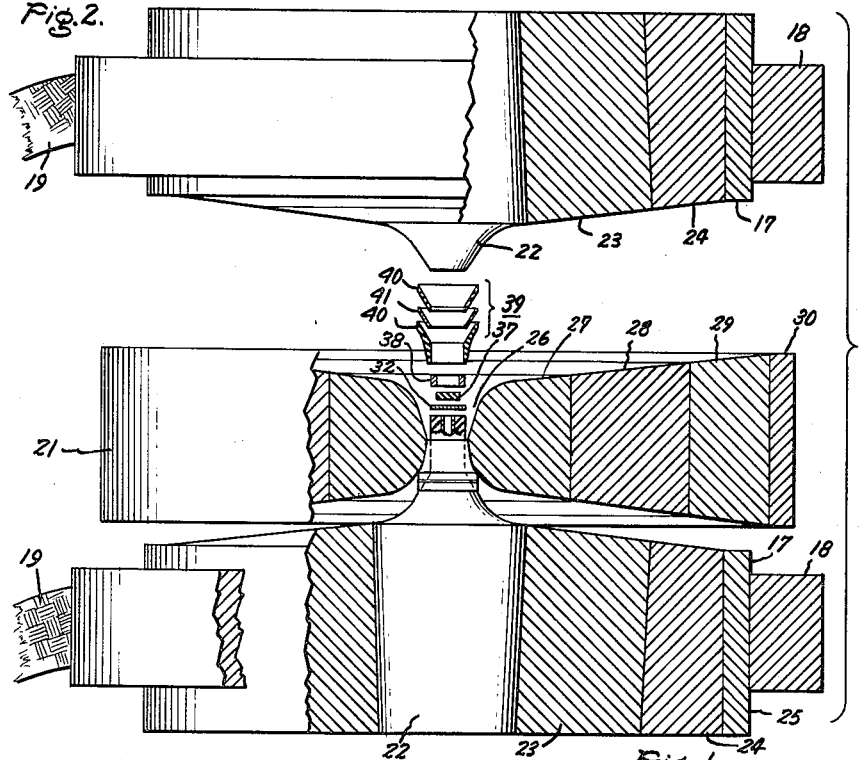
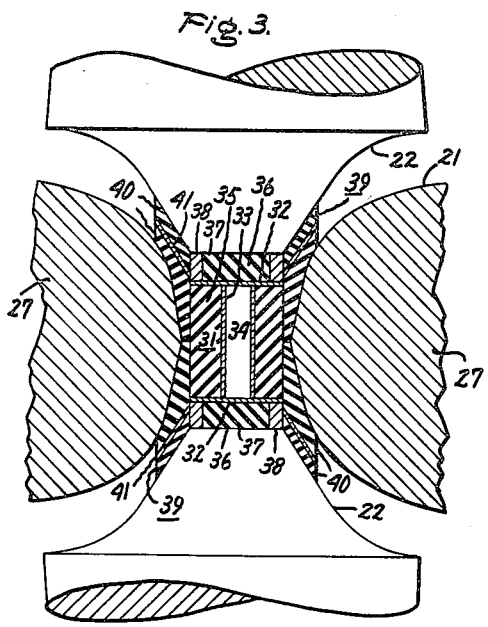
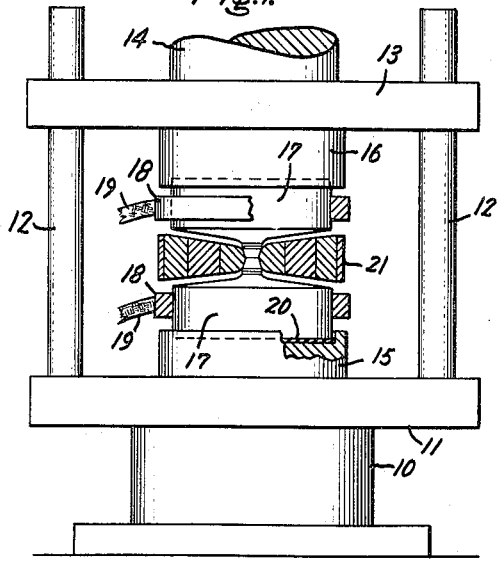
Inventor:
Robert H. Wentorf, Jr.,
by Paul A. Frank
His Attorney.

2,941,861  
Patented June 21, 1960

2,941,861
METHOD OF MAKING GARNET

Robert H. Wentorf, Jr., Schenectady, N.Y., assignor to General Electric Company, a corporation of New York Filed Mar. 31, 1955, Ser. No. 498,445

11 Claims. (Cl. 23—110)

This invention relates to a method for making garnet from hornblende.

Although garnet is a relatively abundant mineral in the United States, it is generally found in mixture with many other types of minerals and, therefore, to obtain garnet in a pure state, it is necessary to mine an ore having a relatively low garnet content and then to concentrate this ore by a relatively tedious process. Because of the many uses for garnet, it has long been the desire of mineralogists to find sources of garnet which do not require ore concentration or to find methods of converting easily obtainable minerals such as hornblende into garnet.

An object of this invention is to transform hornblende into garnet.

A further object of this invention is to convert hornblende into garnet under the action of extremes of heat and pressure.

A still further object of this invention is to provide a process for transforming hornblende into garnet by the action of heat and pressure in the presence of a metallic dehydrator which tends to promote the conversion of hornblende.

Unexpectedly I have discovered that garnet can be formed from hornblende by (1) heating a mixture of hornblende and a metal dehydrator to a temperature above about 1250° C. while maintaining said mixture under a pressure of at least 27,000 atmospheres, and preferably from 27,000 to 40,000 atmospheres, and (2) cooling the resulting product to a temperature below about 1250° C. while maintaining the mixture under the original pressure. More particularly, I have found that hornblende may be converted to garnet by (1) heating a mixture of hornblende and a metallic dehydrator to a temperature above the melting point of garnet while maintaining the mixture under a pressure of at least 27,000 atmospheres and (2) subsequently cooling the mixture to a temperature below the melting point of garnet while maintaining the mixture under the original pressure.

The garnet formed by the process of the present invention cannot be distinguished from naturally occurring garnet by chemical, physical, or X-ray crystallographic methods.

My invention may be best understood by reference to the following description taken in connection with the accompanying drawing in which:

Fig. 1 is a front elevational view of a hydraulic press with a high temperature-high pressure apparatus useful in the practice of my invention;

Fig. 2 is an enlarged, exploded sectional view of the high temperature-high pressure apparatus which is shown in Fig. 1; and Fig. 3 is an enlarged sectional view of the reaction vessel and associated parts which are shown in Figs. 1 and 2.

The term "hornblende" as used in the present application is used to describe the well known mineral, hornblende, which is referred to in all standard textbooks of mineralogy, including, for example, Bragg, "Atomic Structure of Minerals," Cornell University Press, Ithaca, New York, 1937, and Spencer, "The World's Minerals," by Frederick A. Stokes Co., New York, 1916. In general, hornblende may be defined by the following empirical formula:

(1) 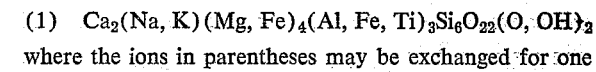

where the ions in parentheses may be exchanged for one another. The term "garnet" as used in this application is also used in its standard mineralogy form to define a group of materials having a stoichiometric formula:

(2) $X_3Y_2(SiO_4)_3$ where X is $Mg^{++}$, $Fe^{++}$, $Mn^{++}$, or $Ca^{++}$ and Y is $Al^{+++}$, $Fe^{+++}$ or $Cr^{+++}$. There are seven known distinct species of garnet as pointed out by Ladoo and Myers, "Nonmetallic Minerals," McGraw-Hill, New York, 1951. The various types of garnet and their structural formulas are listed below:

| Name | Formula |
|---|---|
| Grossularite | $Ca_3Al_2(SiO_4)_3$. |
| Pyrope | $Mg_3Al_2(SiO_4)_3$. |
| Rhodolite | $2Mg_3Al_2(SiO_4)_3.Fe_3Al_2(SiO_4)_3$. |
| Almandite | $Fe_3Al_2(SiO_4)_3$. |
| Spessartite | $Mn_3Al_2(SiO_4)_3$. |
| Andradite | $Ca_3Fe_2(SiO_4)_3$. |
| Uvarovite | $Ca_3Cr_2(SiO_4)_3$. |

Any of the types of garnet listed in the table above may be prepared from hornblende, the type of garnet formed being dependent on the type of hornblende which is employed in my process.

The term "metallic dehydrator" as used in the present invention refers to metals which will react with water under the elevated temperatures and pressures employed to form metallic oxides and hydrogen. Suitable metals include all metals which form stable oxides at the temperatures and pressures employed. Metals which meet this requirement are all of the metals of the periodic table (including silicon and germanium) except platinum, osmium, iridium, palladium, rhodium, ruthenium, copper, silver, gold and mercury. Among the preferred metallic dehydrators are tantalum, titanium, zirconium, iron, silicon and vanadium, with the most preferred metal being tantalum.

Although I do not wish to be bound by theoretical considerations, it is believed that garnets are formed by the process of the present invention by the extraction of water from hornblende. Thus, as the hornblende is heated to a temperature above its melting point and above the higher melting point of garnet, which is about 1250° C. at pressures above about 27,000 atmospheres, the metallic dehydrator reacts with combined water in the hornblende to form the oxide of the metal and hydrogen. As the reaction mixture is then cooled below the melting point of garnet, one or more garnets crystallize out of the mixture. This theory is supported by the fact that garnet cannot be formed from hornblende under the conditions of the present reaction unless a metal which is known to react with water and form a stable oxide under the conditions of reaction, is present with the hornblende. It is also known that garnet is not formed from hornblende under the conditions of the present reaction unless the reaction is carried out at a temperature somewhat above the melting point of garnet and unless the pressure is at least 27,000 atmospheres.

The ratio of the metallic dehydrator to the hornblende is not critical and may vary within wide limits. Thus, as little as 1/100 or as much as 100 parts by volume of metallic dehydrator may be employed per part of hornblende to convert the latter to garnet. However, it is desirable to employ a volumetric excess of dehydrator to insure complete dehydration of the hornblende.

I have found that the time required for the conversion of hornblende into garnet is limited only by the time required to heat the reaction mixture to a temperature above 1250° C. and the time required to subsequently cool it down below about 1250° C. Thus, the conversion may be effected in a matter of seconds. However, maintenance of the reaction mixture at elevated temperatures for extended periods of time has had no adverse effect on the conversion and tends to promote the formation of larger garnet crystals.

The process of the present invention may be carried out in any type of apparatus capable of producing the pressures required at the temperatures required. One apparatus which meets the pressure and temperature requirements of the present invention is that apparatus described in the application of H. T. Hall, Serial No. 488,050, filed Feb. 14, 1955, and assigned to the same assignee as the present invention. (The same apparatus is found described in the application of H. T. Hall, Serial No. 707,432, filed Jan. 6, 1958, and assigned to the same assignee as the present invention.) The disclosure of this Hall application is hereby incorporated by reference into the present application. The apparatus described in the aforementioned Hall application is a high pressure device for insertion between the platens of a hydraulic press. The high pressure device consists of an annular member defining a substantially cylindrical reaction area, and two conical piston-type members designed to fit into the substantially cylindrical portion of the annular member from either side of said annular member. A reaction vessel which fits into the annular member may be compressed by the two piston members to reach the pressures required in the practice of the present invention. The temperature required is obtained by any suitable means, such as, for example, by induction heating, by passing an electrical current through the reaction vessel, or by winding heating coils around the reaction vessel.

The apparatus of this aforementioned Hall application is shown in the drawing. In Fig. 1 of the drawing a hydraulic press comprises a base 10 with a press bed 11 on which is mounted a plurality of vertical shafts 12 to support a carriage 13 with a hydraulic shaft 14. A pair of opposed, recessed pistons 15 on bed 11 and carriage 13 are recessed to partially position members 17 therein, each of which is provided with an electrical connection in the form of an annular conducting ring 18 with a connector 19 to supply electric current from a source of power (not shown) through members 17 to the high temperature-high pressure reaction vessel which is described below. A layer of electrical insulation 20 is provided between at least one member 17 and its associated piston 15 to prevent conduction of electrical current through the press. A pressure resisting member or belt 21 is positioned between opposed members 17 to provide a multi-staging pressure effect.

As is best shown in Fig. 2 each member 17 comprises a die 22 with surrounding binding rings 23 and 24. If desired, a soft steel safety ring 25 is located around binding ring 24. Conducting ring 18 is mounted around the periphery of safety ring 25 to conduct current through rings 25, 24 and 23 to die 22. Pressure resisting member 21, which is positioned between opposed members 17 tapers inwardly towards its center to provide an aperture 26 in axial alignment with opposed dies 22. Such a tapering effect produces greater strength in member 21 to resist pressure. Member 21 comprises an inner ring 27 surrounded by one or more binding rings 28, 29 and a soft steel safety ring 30.

As is best shown in Figs. 2 and 3, reaction vessel 31 which is positioned in aperture 26 between dies 22 comprises a pair of spaced, conductive disks 32 with a hollow conductive cylinder 33 therebetween adapted to contain specimen 34 to be subjected to high temperature-high pressure conditions. A washer 35 of electrically insulating material is positioned around cylinder 33 between disks 32 to complete the assembly of reaction vessel 31. If it is desired, vessel 31 may be in the form of a hollow casing which is in electrical contact with dies 22 but which is thermally insulated from inner ring 27. A washer 36 is positioned between each die 22 and its associated disks 32 to provide a heat insulating core 37 with a surrounding outer conducting ring 38 in electrical contact with the die.

A laminated conical gasket assembly 39 surrounds each die 22 and comprises a pair of thermally and electrically insulating and pressure resisting conical washers 40 with a metallic washer 41 between adjacent washers 40. The outer pressure resisting washer 40 is tapered inwardly to be engaged on its outer surface by the tapered surface of inner ring 27 of member 21 and on its interior surface by the washer 35 of vessel 31. While only a pair of washers 40 with a separate metallic washer 41 are illustrated in the drawing, a plurality of alternate washers further increases the size of reaction vessel 31, the permissible motion between dies 22, and the pressure. Relatively high pressures are obtained when inner washer 40 and metallic washer 41 are eliminated and vessel 31 is shortened this corresponding thickness along the center line. However, pressures of the order of 40,000 to more than 100,000 atmospheres are produced when gasket assembly 39 is employed through additional increases in both relative motion and compressed. Examples of suitable materials from which core 37 and washers 35 and 40 may be made are pyrophyllite and catlinite.

In the operation of the high temperature-high pressure apparatus shown in Figs. 1 to 3, each member 17 with associated conducting ring 18 and connector 19 is positioned partially within the recess of its associated piston in the press. Specimen 34 which is to be subjected to a high temperature-high pressure environment is placed in cylinder 33 within washer 35 between disks 32 to complete the reaction vessel 31. Pressure resisting member 21 is positioned between opposed members 17 to locate vessel 31 in aperture 26 between dies 22.

Pressure is applied to specimen 34 by shaft 14 of the press. At the same time electric current is supplied from one electrical conductor such as upper conductor 19 to upper conducting ring 18, rings 25, 24 and 23, die 22, ring 38, and disk 32 to generate heat in cylinder 33 of vessel 31. The current path continues from cylinder 33 to the lower disk 32, rim 38, die 22, rings 23, 24 and 25, conducting ring 18, and connector 19 to the electrical source. Pressures in excess of 95,000 atmospheres at temperatures higher than 2000° C. have been maintained in such apparatus for periods of hours.

In the preferred embodiment of my invention I employ a reaction vessel comprising a cylinder 33 of tantalum having a hollowed out cylindrical center portion, the axis of the center portion being coaxial with the axis of the reaction vessel. Into this tantalum reaction vessel is placed powdered hornblende. The hollowed out center portion of the vessel may then be sealed with metallic disks and placed in the apparatus described in the above-mentioned Hall application and subjected to the elevated temperature and pressure required to effect the transformation of the hornblende to garnet. Alternatively, instead of employing a reaction vessel, a cylinder or sheet of hornblende may be sandwiched between two disks formed of a metallic dehydrator and compression of the sandwich to the proper temperature and pressure will cause the conversion of the hornblende to garnet.

In preparing garnet by the method of the present invention it is difficult to measure the pressure to which the reactants are subjected by direct means because of the extremely high pressures employed. Therefore, the pressure is measured by indirect means. In measuring the pressure, recognition is taken of the fact that certain metals undergo distinct changes in electrical resistance at particular pressures. Thus, bismuth undergoes a phase change which results in a change in electrical resistance at 24.800 atmospheres and thallium undergoes such a change at 43,500 atmospheres. By placing bismuth or thallium in a reaction vessel similar to that employed in the practice of the present invention using the aforementioned Hall apparatus and recording the platen pressure at which the transformation or phase change of each of these metals occurs, it is possible to calibrate the pressure inside of the reaction vessel in terms of the pressure applied to the platen of the press.

The temperature in the reaction vessel is determined by fairly conventional means such as by placing a thermocouple junction in the reaction vessel and measuring the temperature of the junction in the usual manner. The temperature of the reaction chamber may also be determined by measuring the resistance of heating coils such as platinum heating coils wound around the reaction chamber. The temperature of platinum is determined from its well known temperature coefficient of resistance. Thus the temperature within the reaction vessel is determined by relatively conventional means during the course of reaction and the pressure within the vessel is read from a plot of the relationship between the pressure applied to the platens of the press to the pressure within the reaction vessel.

The temperature measured by the method above and referred to throughout this application are the temperatures in the hottest portion of the reaction vessel. It should be understood, however, that the temperature may vary over a range of from 100–200° C. between spaced points in the reaction vessel.

The following examples are illustrative of the practice of my invention and are not intended for purposes of limitation. In all of these examples the reaction vessel consisted of a cylindrical member having a cylindrical aperture therethrough, the axis of the aperture being coaxial with that of the cylinder. The walls of the cylindrical member were approximately one-sixth as thick as its diameter and the length of the cylinder was approximately 3.5 times the outside diameter. In all cases, the cylindrical aperture was packed with a powdered material or mixture of materials as indicated. Disk-like members were placed at each end of the cylindrical member, the diameters of the disks being about three times the outside diameter of the cylindrical member, and the thickness of each disk being approximately one-tenth its diameter. The disk was formed of either a metallic dehydrator or a metal inert under the conditions of the reaction. In all of the examples the parts of ingredients which make up the charge to the reaction chamber are given in terms of parts by volume. In all of these examples the reaction vessel and its contents were subjected to high temperature and high pressure by means of the apparatus disclosed in the aforementioned Hall application. The hornblende used in the examples was obtained from Gore Mountain, near North Creek, New York. In all of the examples the garnet formed was examined by at least one of the following methods to make sure that the product formed was actually garnet: X-ray crystallography, refractive index, density, chemical analysis, hardness tests, and microscopic examination.

*Example 1*

A cylindrical tantalum reaction vessel as described above was filled with powdered hornblende and subjected to a pressure of 40,000 atmospheres. The temperature of the reaction vessel was increased from room temperature to a temperature of about 1300° C. and maintained at this temperature for three to four minutes. The temperature was then lowered to room temperature and subsequently the pressure was released. This resulted in a plurality of garnet dodecahedra which were identified as garnet by X-ray crystallographic analysis and by microscope examination. The X-ray diffraction pattern of the garnet produced in the example was obtained by taking a Debye-Scherrer photograph in a cylindrical camera of 5 cm. radius with a $CuK_a$ radiation. The interplanar spacings and the intensity of the lines used to determine these spacings were compared with the spacings and line intensities of natural garnet obtained from Gore Mountain and also compared with similar data which appears in the literature. The garnet produced in this example had a Debye-Scherrer photograph line corresponding to each of the lines in a similar photograph of natural garnet and the intensities of corresponding lines were similar.

*Example 2*

Powdered hornblende in a tantalum reaction vessel was compressed under a pressure of about 30,000 atmospheres and heated under this pressure to a temperature of about 1300° C. After being maintained at this temperature for about five minutes the reaction mixture was cooled to room temperature and the pressure was released. This also resulted in a plurality of garnet dodecahedra.

*Example 3*

Powdered hornblende in a tantalum reaction vessel was compressed to 27,000 atmospheres and heated to a maximum temperature of about 1300° C. The temperature was maintained in the range of 1200–1300° C. for about five minutes and the reaction mixture was then cooled to room temperature and the pressure was released. Examination of the product in the reaction vessel showed a plurality of garnet dodecahedra.

*Example 4*

A mixture of one part by weight of tantalum chips and five parts by weight of hornblende was placed in a cylindrical graphite reaction vessel such as previously described and compressed to 40,000 atmospheres. The reaction vessel and its contents were then heated to about 1300° C. and maintained at a temperature of around 1300° C. for seven minutes. The reaction vessel was then cooled to room temperature and the pressure was released. Examination of the material in the reaction vessel revealed a number of garnet dodecahedra.

*Example 5*

A mixture of 1 part of iron and 5 parts of hornblende was placed in a cylindrical graphite reaction vessel as described above and compressed to 40,000 atmospheres. The reaction vessel was heated to a temperature of about 1300° C. and maintained at this pressure for about eight minutes before cooling to room temperature and releasing the pressure. Examination of this mixture also showed a number of garnet crystals.

Although the foregoing examples have described the present invention only in connection with reaction vessels in the form of cylinders, it should be understood that the geometry of the reaction vessel is not critical and that shapes other than cylindrical may be used effectively. It should also be understood that pressures above 40,000 atmospheres may be used in carrying out the process of the present invention even though specific examples of such higher pressures are not shown. It should also be understood that dehydrators other than the iron and tantalum illustrated may also be employed. Thus, any of the dehydrators previously enumerated or any metal which will react with water under the conditions of reaction to form hydrogen and a stable oxide may be employed in the present process.

Since garnets prepared by the method of this invention are indistinguishable from natural garnets they have the same utility as natural garnets, e.g., as gems for use in jewelry, as jewels for watches, and as the abrasive surface in abrasive paper, coated abrasive wheels, etc.

What I claim as new and desire to secure by Letters Patent of the United States is:

1. The method of making garnet which comprises compressing a mixture of hornblende and a metallic dehydrator under a pressure of at least 27,000 atmospheres while heating said mixture to a temperature above about 1250° C. and subsequently cooling said mixture to a temperature below about 1250° C., the said metallic dehydrator being a metal reactive with water and capable of forming a stable metallic oxide under the pressures and at the temperatures recited above.

2. The process of claim 1 in which the metallic dehydrator is tantalum.

3. The process of claim 1 in which the metallic dehydrator is iron.

4. The method of making garnet which comprises (A) heating a mixture of hornblende and a metallic dehydrator to a temperature above the melting point of garnet while maintaining said mixture under a pressure of at least 27,000 atmospheres and (B) cooling said mixture to a temperature below the melting point of garnet while maintaining said mixture under a pressure of at least 27,000 atmospheres, the said metallic dehydrator being a metal reactive with water and capable of forming a stable metallic oxide under the pressures and at the temperatures recited above.

5. The method of claim 4 in which the metallic dehydrator is tantalum.

6. The method of claim 4 in which the metallic dehydrator is iron.

7. The method of making garnet which comprises (A) heating a mixture of hornblende and a metal selected from the class consisting of tantalum and iron to a temperature above the melting point of garnet while maintaining said mixture under a pressure of at least 27,000 atmospheres and (B) cooling said mixture to a temperature below the melting point of garnet while maintaining said mixture under a pressure of at least 27,000 atmospheres.

8. The method of making garnet which comprises (A) heating a mixture of hornblende and a metal selected from the class consisting of tantalum and iron to a temperature above the melting point of garnet while maintaining said mixture under a pressure of about 40,000 atmospheres and (B) cooling said mixture to a temperature below the melting point of garnet while maintaining said mixture under a pressure of about 40,000 atmospheres.

9. The method of making garnet which comprises (A) heating a mixture of hornblende and a metal selected from the class consisting of tantalum and iron to a temperature of about 1300° C. while maintaining said mixture under a pressure of at least 27,000 atmospheres and (B) cooling said mixture to a temperature below the melting point of garnet while maintaining said mixture under a pressure of at least 27,000 atmospheres.

10. The method of claim 9 in which the metal is tantalum.

11. The method of claim 9 in which the metal is iron.

References Cited in the file of this patent

UNITED STATES PATENTS

| | | |
|---|---|---|
| 1,087,705 | Allen | Feb. 17, 1914 |
| 1,422,216 | McDougal et al. | July 11, 1922 |

OTHER REFERENCES

Vogt: "Chem. Abstracts," vol. 17, column 516[7] (1923), abstract taken from "J. Geol." 30, 611–630 (1922).

Shaub: "Chem. Abstracts," vol. 45, column 1475c (1951), abstract taken from "Am. Mineral" 34, 573–82 (1949).

Michel-Levy: "Chem. Abstracts," vol. 48, column 1903h (1954), abstract taken from "Bull. soc. franc. mineral" 76, 237–93 (1953).